United States Patent
Yoshino et al.

(10) Patent No.: US 7,487,792 B2
(45) Date of Patent: Feb. 10, 2009

(54) CONSTANT FLOW VALVE

(75) Inventors: Kenro Yoshino, Nobeoka (JP); Akihiro Tsuzuki, Nobeoka (JP)

(73) Assignee: Asahi Organic Chemical Industry Co., Ltd., Miyazaki (JP)

( * ) Notice: Subject to any disclaimer, the term of this patent is extended or adjusted under 35 U.S.C. 154(b) by 227 days.

(21) Appl. No.: 10/584,408

(22) PCT Filed: Dec. 25, 2003

(86) PCT No.: PCT/JP03/16817

§ 371 (c)(1),
(2), (4) Date: Jun. 26, 2006

(87) PCT Pub. No.: WO2005/064214

PCT Pub. Date: Jul. 14, 2005

(65) Prior Publication Data
US 2007/0163657 A1    Jul. 19, 2007

(51) Int. Cl.
*G05D 7/01* (2006.01)
(52) U.S. Cl. .................................. 137/504
(58) Field of Classification Search ........... 137/501, 137/504
See application file for complete search history.

(56) References Cited

U.S. PATENT DOCUMENTS 3,215,159 A * 11/1965 Nixon ................. 137/501
5,983,926 A * 11/1999 Mastuzawa ........... 137/501
2003/0116196 A1 * 6/2003 Sasao ..................... 137/501

FOREIGN PATENT DOCUMENTS

| JP | 47-3277 | 2/1972 |
| JP | 55-53829 | 12/1980 |
| JP | 04-160276 A | 6/1992 |
| JP | 05-099354 A | 4/1993 |
| JP | 26-00913 | 8/1999 |
| JP | 2001-004045 A | 1/2001 |

* cited by examiner

*Primary Examiner*—Stephen M Hepperle
(74) *Attorney, Agent, or Firm*—Buchanan Ingersoll & Rooney PC

(57) ABSTRACT

A constant flow valve has a chamber (6) provided therein with a first diaphragm (8) having a valve member (7), a second diaphragm (9) and a third diaphragm (10). The chamber is divided into a first pressure chamber (11), a second valve chamber (12), a first valve chamber (13) and a second pressure chamber (18). The first pressure chamber has means for applying a constant inward force to the second diaphragm, and the second pressure chamber has means for applying a constant inward force to the third diaphragm. The first valve chamber is communicated with an inlet channel, the second valve chamber has a valve seat (27) corresponding to the valve member, and the valve seat divides the chamber into a bottom valve chamber (14) communicating with the first valve chamber through a communication hole formed in the first diaphragm and a top valve chamber (15) communicating with an outlet channel.

4 Claims, 7 Drawing Sheets

CONSTANT FLOW VALVE

TECHNICAL FIELD

The present invention relates to a constant flow valve giving a constant flow rate even if the fluid pressure at the upstream side and downstream side of the valve changes, and more particularly relates to a constant flow valve with no sliding parts so as to prevent the formation of dust and superior in quick response.

BACKGROUND ART

Various constant flow valves have been proposed in the past. As one, there is the type disclosed in Japanese Unexamined Patent Publication No. 5-99354. In this type of constant flow valve, as shown in FIG. 8, a valve seat 102 provided in a channel 101 and a diaphragm 104 having a valve body 103 facing the valve seat 102 define a diaphragm chamber 105. A force in the direction to open the valve acts on the diaphragm 104 through a spring 106. The diaphragm 104 is formed with a communication passage 107 so that the inlet side fluid flows into the diaphragm chamber 105.

Due to this configuration, the fluid flowing from the inlet side of the constant flow valve into the constant flow valve presses the diaphragm 104 in the to close the valve, is reduced in pressure at the communication passage 107, and then enters the diaphragm chamber 105. The fluid flowing into the diaphragm chamber 105 presses the diaphragm 104 in the direction to open the valve, flows through a fluid control part 108 formed between the valve seat 102 and the valve body 103 of the diaphragm 104 during which it is reduced in pressure, and then flows out to the outlet side of the constant flow valve.

Further, the difference between the closing direction force and the opening direction force acting on the diaphragm 104 is balanced with the spring 106 biasing the diaphragm 104 in the opening direction.

For this reason, if the fluid pressure at the inlet side of the constant flow valve increases or the fluid pressure of the outlet side of the constant flow valve decreases, the closing direction force acting on the diaphragm 104 increases and the opening area of the fluid control part 108 decreases thereby to increase the fluid pressure of the diaphragm chamber 105. Due to this, the opening direction force acting on the diaphragm 104 increases, so that the difference between the closing direction and opening direction forces acting on the diaphragm 104 becomes balanced with the force of the spring 106 again.

On the other hand, if the fluid pressure at the inlet side of the constant flow valve decreases or the fluid pressure at the outlet side of the constant flow valve increases, the opening area of the fluid control part 108 increases, so that the difference between the closing direction and opening direction forces acting on the diaphragm 104 becomes balanced with the force of the spring 106.

Therefore, the difference between the inlet side fluid pressure acting on the diaphragm 104 and the fluid pressure in the diaphragm chamber 105 is held constant, so the pressure difference before and after the communication passage 107 becomes constant and the flow rate can be held constant.

However, since the strength of the spring 106 cannot be changed without disassembling the constant flow valve, the pressure difference before and after the communication passage 107 cannot be changed and therefore the setting of the flow rate cannot be changed after the valve is installed in a pipe.

Further, since the spring 106 contacts the fluid, the metal is liable to dissolve into the fluid or the spring is liable to corrode due to chemicals.

Further, as the valve cannot be completely closed, a separate valve has to be connected in order to cut off the fluid.

DISCLOSURE OF THE INVENTION

Accordingly, an object of the present invention is to provide a closable constant flow valve enabling settings of the flow rate to be simply changed even after installation of the valve in a pipe and free from concern over the dissolution of metal or corrosion by chemicals.

According to the present invention, there is provided a constant flow valve which includes a body unit formed by a inlet channel and outlet channel for fluid and a chamber communicating with the inlet channel and outlet channel, and a valve member provided in the chamber and having a valve body and a first diaphragm, wherein the chamber further includes with a second diaphragm and third diaphragm positioned at the two sides of the valve member and having effective pressure receiving areas smaller than the first diaphragm, the valve member and the diaphragms being mounted in the chamber by the diaphragms being fixed to the body unit at the circumferences thereof, the chamber being divided into a first pressure chamber formed between one end of the chamber and the second diaphragm, a second pressure chamber formed between the other end of the chamber and the third diaphragm, a first valve chamber formed between the first diaphragm and the third diaphragm, and a second valve chamber formed between the first diaphragm and the second diaphragm, the first pressure chamber having means for applying a constant inward force to the second diaphragm at all times, the first valve chamber communicating with the inlet channel, the second valve chamber having a valve seat cooperating with a valve body of the valve member, the second valve chamber being divided into a bottom second valve chamber positioned at the first diaphragm side with respect to the valve seat and communicating with the first valve chamber through a communication hole formed in the first diaphragm and a top second valve chamber positioned at the second diaphragm side and communicating with the outlet channel, the space between the valve body and the valve seat forming a fluid control part using displacement of the valve member with respect to the valve seat to change the opening area between the valve body and the valve seat to control the fluid pressure of the bottom second valve chamber, the second pressure chamber having means for applying a constant inward force to the third diaphragm at all times.

The means for applying a constant inward force may be a spring device or pressurized fluid.

Preferably, a fourth diaphragm is provided in the first pressure chamber and constant force is applied through the fourth diaphragm to the second diaphragm.

BRIEF DESCRIPTION OF THE DRAWINGS

The above and other objects, features, and advantages of the present invention will be described blow in further detail based on embodiments of the present invention with reference to the drawings, in which.

BEST MODE FOR CARRYING OUT THE INVENTION

Embodiments of the present invention will be described below with reference to the drawings, but the present invention is, of course, not limited to these embodiments.

Figure 1:
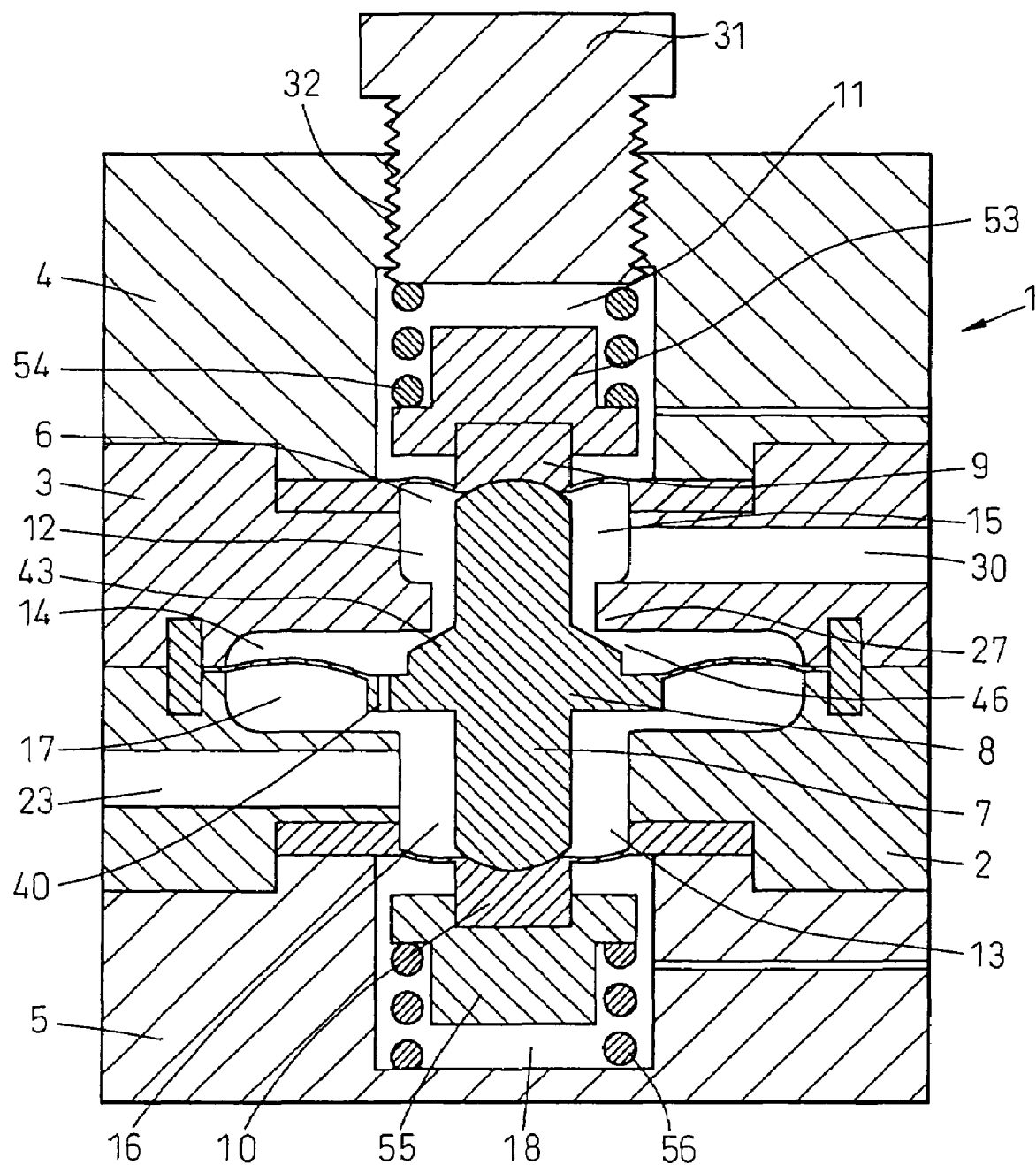
FIG. 1 is a longitudinal sectional view of an embodiment of a constant flow valve according to the present invention.

Referring to FIG. 1, a body unit 1 of the constant flow valve is divided into, from the top, a body-C 4, a body-B 3, a body-A 2, and a body-D 5 and is formed by assembling these together. The body unit 1 has inside it a chamber 6 divided into a first pressure chamber 11, a second valve chamber 12, a first valve chamber 13, and a second pressure chamber 18, an inlet channel 23 through which fluid flows from the outside to the chamber 6, and an outlet channel 30 through which fluid flows from the chamber 6 to the outside.

Figure 3:
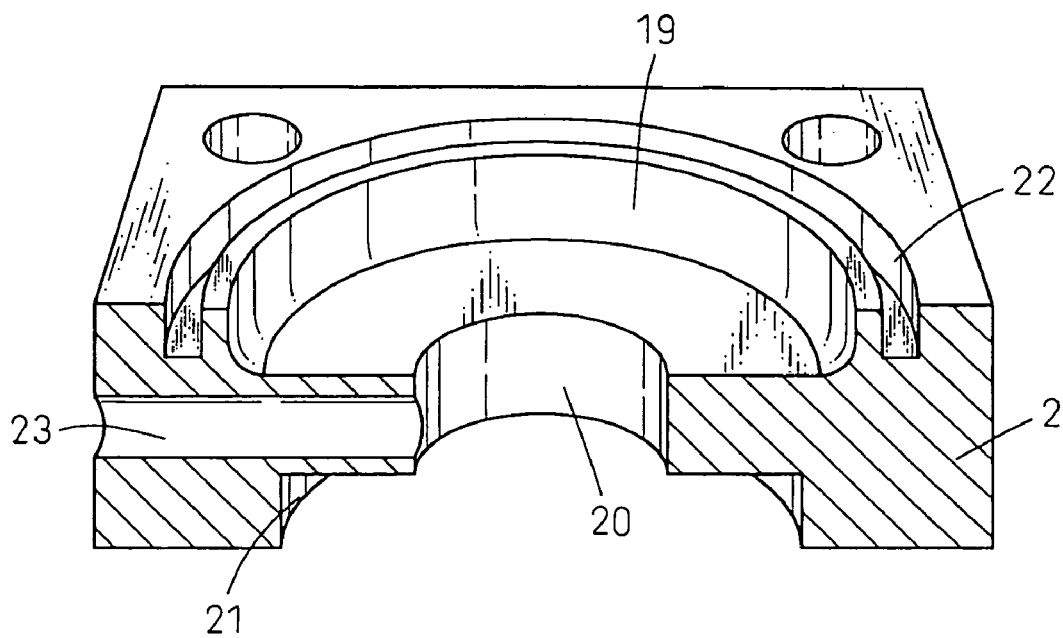
FIG. 3 is a half perspective view of part of the body shown in FIG. 1.

The body-A 2 is formed from polyfluoroethylene (PTFE) and is positioned at the center of the body unit 1. As shown in FIG. 3, the body-A 2 is provided at the top thereof with a circular recess-shaped top step difference 19. The top step difference 19 is provided at the center thereof with a hole 20 having a diameter smaller than the top step difference 19 and forming a bottom first valve chamber 16. Further, the hole 20 is connected at the bottom thereof to a circular recess-shaped bottom step difference 21 having a diameter larger than the diameter of the hole 20. The body-A 2 is provided at the top surface thereof, that is, at the circumferential edge of the top step difference 19, with a ring-shaped groove 22 and is further provided with an inlet channel 23 extending from the side surface thereof to the hole 20 of the body-A 2 and communicating the two.

Figure 4:
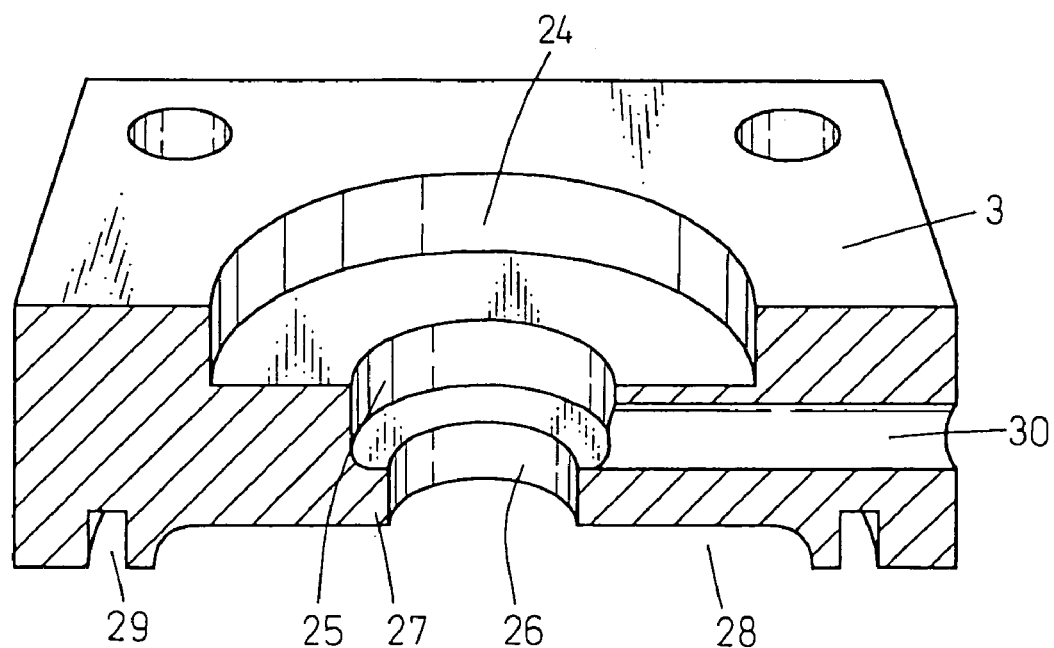
FIG. 4 is a half perspective view of another part of the body shown in FIG. 1.
Figure 5:
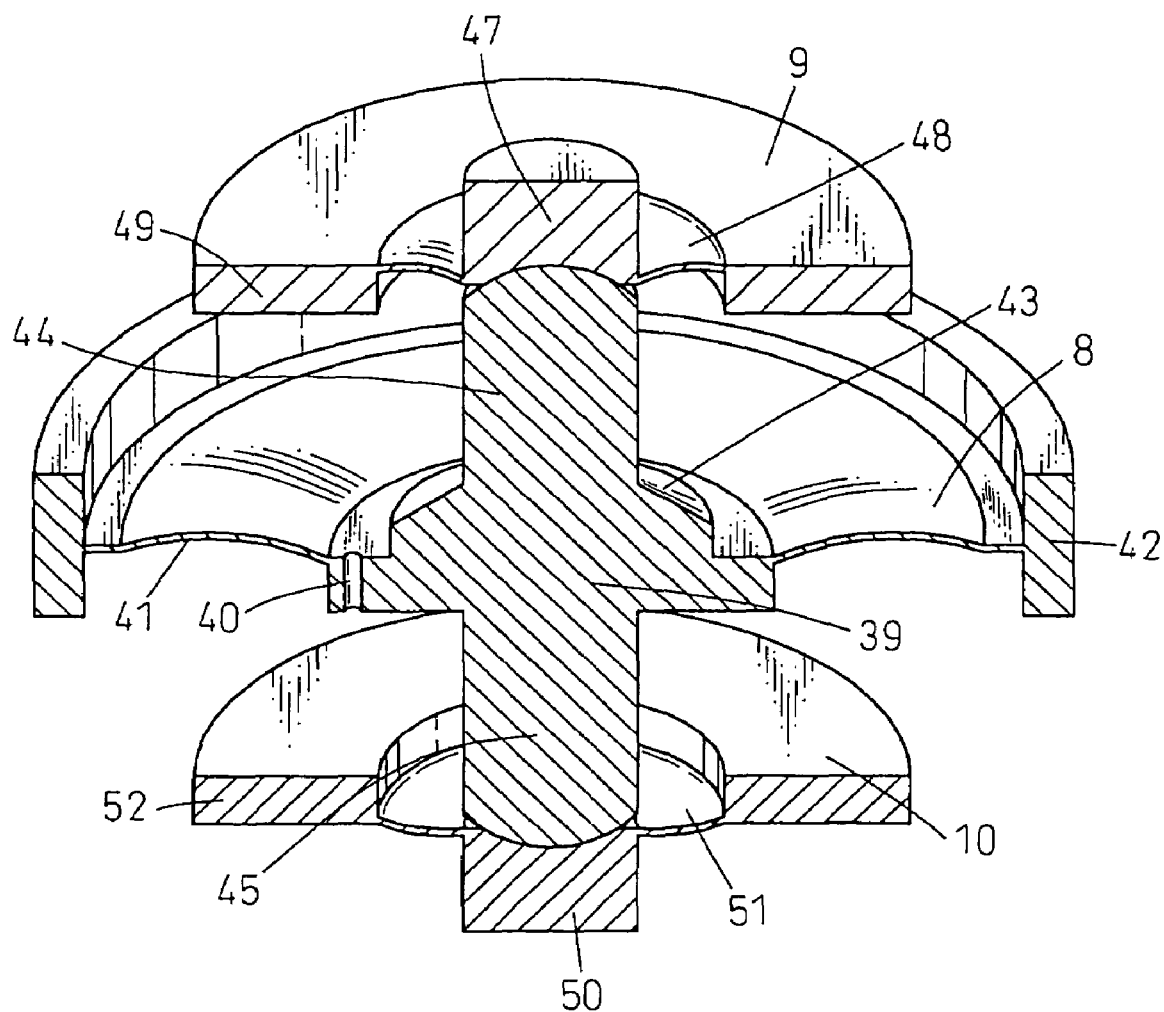
FIG. 5 is a half perspective view of the diaphragms.

The body-B 3 is formed from PTFE and is fixedly engaged with the top surface of the body-A 2. As shown in FIG. 4, the body-B 3 is provided at the top thereof with a circular recess-shaped top step difference 24. The top step difference 24 is provided at the center thereof with a hole 25 having a diameter smaller than the top step difference 24 and forming a top second valve chamber 15. Further, the hole 25 is connected at the bottom thereof with an opening 26 having a diameter smaller than the hole 25 and with a circular recess-shaped bottom step difference 28 having a diameter the same as the top step difference 19 of the body-A 2. The circumferential edge of the bottom end surface of the opening 26 forms a valve seat 27. The body-B 3 is provided at the bottom surface thereof, that is, at the circumferential edge of the bottom step difference 28, with a ring-shaped groove 29 at a position facing the ring-shaped groove 22 of the body-A 2 and is further provided with an outlet channel 30 extending from a side surface of the body-B 3 positioned at the opposite side to the inlet channel 23 of the body-A 2 to the hole 25 and communicating the two.

The body-C 4 is formed from polyvinylidene fluoride (PVDF) and is fixedly engaged with the top of the body-B 3. The body-B 3 is provided at the top center thereof with a female thread 32 into which a bolt 31 may be screwed and is further provided with a hole (bore) 33 (FIG. 2) connecting to the bottom of the female thread 32 and forming the first pressure chamber 11. The body-C 4 is provided with a small diameter air vent 35 (FIG. 2) extending from the side surface thereof to the hole 33 and communicating the two and is further provided at the bottom end face thereof with a ring-shaped projection 34 centered about the hole 33 and engaging with the top step difference 24 of the body-B 3.

The body-D 5 is formed from PVDF and is fixedly engaged with the bottom of the body-A 2. The body-D 5 is provided at the center thereof with a hole (bore) 36 (FIG. 2) opened at the top surface and forming the second pressure chamber 18. The hole 36 is provided around the top surface thereof with a ring-shaped projection 37 fixedly engaging with the bottom step difference 21 of the body-A 2. Further, the body-D 5 is provided with a small diameter air vent 38 extending from the side surface thereof to the hole 36 and communicating the two.

The above described four bodies-A, -B, -C, and -D forming the body unit 1 are clamped and secured together by bolts and nuts (not shown).

A valve member formed from PTFE is indicated by reference numeral 7. The valve member 7 includes a first diaphragm 8. The first diaphragm 8 has a thick part 39 provided at the center in a flange shape, a communication hole 40 extending through the thick part 39, a circular thin film 41 provided to extend from the outer circumference of the thick part 39 in the radial direction, and a ring-shaped rib 42 provided to project out above and below at the outer circumferential edge of the thin film 41. The valve member 7 further includes a reversed bowl-shaped valve body 43 provided at the top center of the first diaphragm 8 and having a slanted surface, a top rod 44 provided to project out upward from the top of the valve body 43 and having a top end formed in a semispherical shape, and a bottom rod 45 provided to project out downward from the center of the bottom end face of the thick part 39 and having a bottom end formed in a semispherical shape, which are formed integrally together with the first diaphragm. The ring-shaped rib 42 provided at the outer circumferential edge of the first diaphragm 8 is engaged with the two ring-shaped grooves 22 and 29 provided on the body-A 2 and the body-B 3 and is clamped and secured between the body-A 2 and the body-B 3. Further, a space formed between the slanted surface of the valve body 43 and the circumferential edge of the bottom end face of the opening 26 of the body-B 3 (FIG. 4) functions as a fluid control part 46.

Below the valve member 7 is provided a second diaphragm 9 formed from PTFE. The second diaphragm 9 includes a columnar thick part 47 provided at the center, a circular thin film 48 provided to extend from the bottom end face of the thick part 47 in the radial direction, and a ring-shaped seal 49 provided at the outer circumferential edge of the thin film 48, which are formed integrally. Further, the ring-shaped seal 49 of the outer circumferential edge of the thin film 48 is clamped and held between the top step difference 24 of the body-B 3 and the ring-shaped projection 34 of the body-C 4.

It should be noted that the pressure receiving area of the second diaphragm 9 has to be smaller than that of the first diaphragm 8.

Above the valve member 7 is provided a third diaphragm 10 made from PTFE. The third diaphragm 10 includes a columnar thick part 50 provided at the center, a circular thin film 51 provided to extend from the top end face of the thick part 50 in the radial direction, and a ring-shaped seal 52 provided at the outer circumferential edge of the thin film 51, which are formed integrally. In this way, the third diaphragm 10 is shaped the same as the second diaphragm 9 and is arranged upside down. The top end face of the thick part 50 contacts the bottom rod 45 of the valve member 7. Further, the ring-shaped seal 52 of the outer circumferential edge of the thin film 51 is clamped and held between the bottom step difference 21 of the body-A 2 and the ring-shaped projection 37 of the body-D 5.

It should be noted that the pressure receiving area of the third diaphragm 10 has to be smaller than that of the first diaphragm 8 in the same way.

Figure 2:
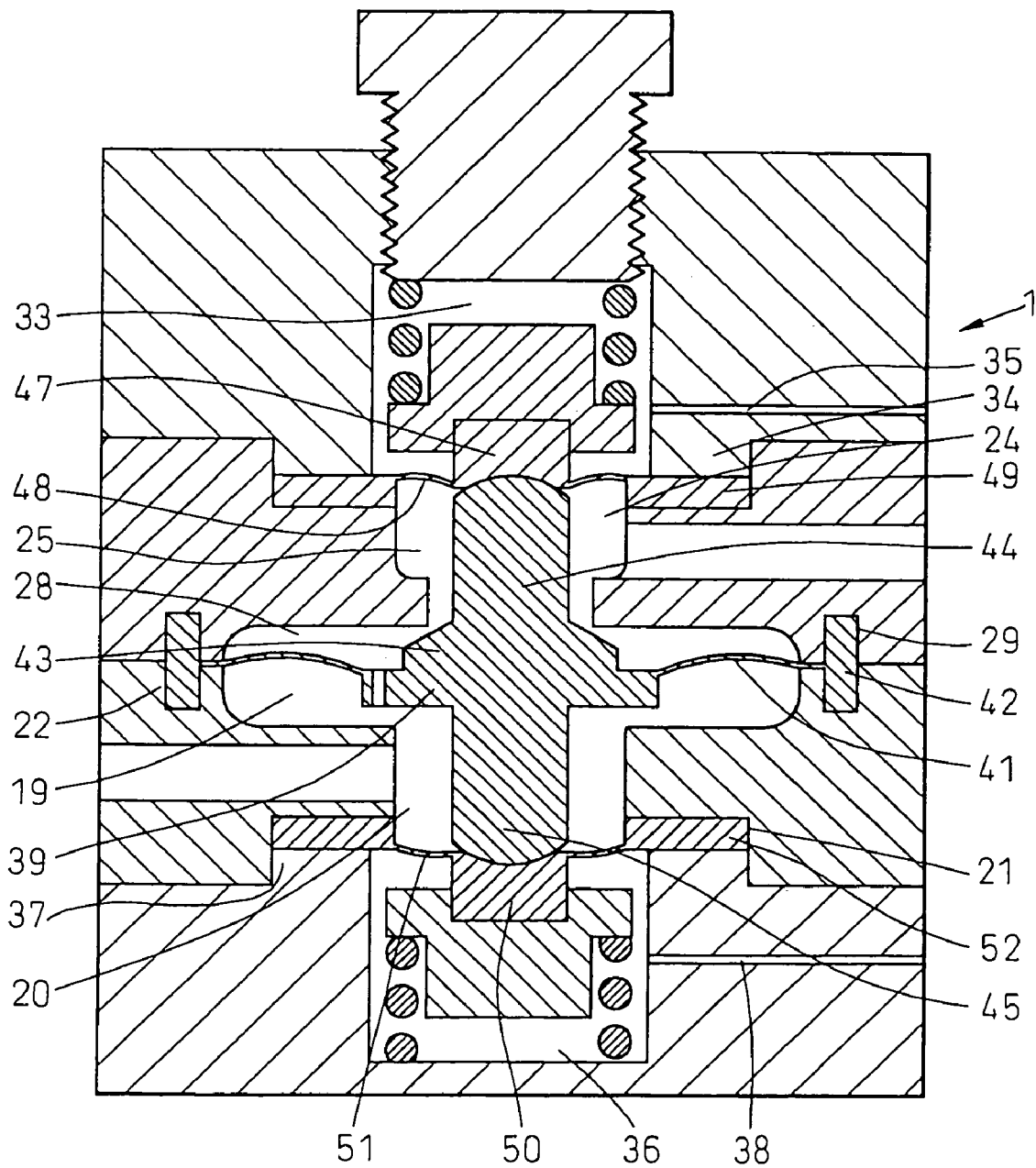
FIG. 2 is a view in which other reference numerals are added to FIG. 1.

Referring to FIG. 1, a spring holder 53 made from PVDF is arranged in the hole 33 of the body-C 4 and is engaged with the thick part 47 of the second diaphragm 9. The spring holder 53 presses the second diaphragm 9 inward (in FIG. 1, downward) at all times by the spring 54 arranged between the spring holder 53 and the bolt 31 screwed into the female thread 32 of the body-C 4. In this embodiment, the spring 54 and the spring holder 53 form a pressurizing means, but such a means may be provided by introducing pressurized air or other fluid into the hole 33 of the body-C 4 (FIG. 2).

Similarly, a spring holder 55 formed from PVDF and a spring 56 formed from SUS are arranged in the hole 36 of the body-D 5. The spring holder 55 is engaged with the thick part 50 of the third diaphragm 10. The two act the same as the spring holder 53 and spring 54 to press the third diaphragm 10 inward (in FIG. 1, upward). As the rest is similar to the above, an explanation will be omitted.

It will be understood that the chamber 6 formed inside the body unit 1 to have the configuration explained above is divided into, from above, the first pressure chamber 11 formed by the second diaphragm 9 and the hole 33 of the body-C 4, the second valve chamber 12 comprised of both the bottom second valve chamber 14 formed between the first diaphragm 8 and the bottom step difference 28 of the body-B 3 and the top second valve chamber 15 formed by the second diaphragm 9 and the hole 25 of the body-B 3, the first valve chamber 13 comprised of the bottom first valve chamber 16 formed by the third diaphragm 10 and the hole 20 of the body-A 2 and the top first valve chamber 17 formed by the first diaphragm 8 and the step difference 19 of the body-A 2, and the second pressure chamber 18 formed by the third diaphragm 10 and the hole 36 of the body-D 5.

The constant flow valve of the first embodiment constituted as explained above operates as follows.

The fluid flowing from the inlet channel 23 of the body-A 2 to the first valve chamber 13 passes through the communication hole 40 of the valve member 7 thereby to be reduced in pressure and then flows into the bottom second valve chamber 14. Further, the fluid flows from the bottom second valve chamber 14 through the fluid control part 46 into the top second valve chamber 15. At that time, the pressure loss at the fluid control part 46 causes the fluid to again be reduced in pressure and flow out from the outlet channel 30. Here, since the communication hole 40 has a diameter set sufficiently small, the flow rate of the fluid flowing through the valve is determined by the pressure difference before and after the communication hole 40.

At this time, if studying the forces which the diaphragms 8, 9, and 10 receive from the fluid, the first diaphragm 8 receives upward force due to the fluid pressure difference between the first valve chamber 13 and bottom second valve chamber 14, the second diaphragm 9 receives upward force due to the fluid pressure in the top second valve chamber 15, and the third diaphragm 10 receives downward force due to the fluid pressure in the first valve chamber 13. Here, since the pressure receiving area of the first diaphragm 8 is designed to be sufficiently larger than the pressure receiving areas of the second diaphragm 9 and third diaphragm 10, the forces acting on the second and third diaphragms 9 and 10 can be substantially ignored compared with the force acting on the first diaphragm 8. Therefore, the force received by the valve member 7 becomes an upward force due to the fluid pressure difference in the first valve chamber 13 and in the bottom second valve chamber 14.

Further, the valve member 7 is biased downward by the pressurizing means of the first pressure chamber 11 and simultaneously is biased upward by the pressurizing means of the second pressure chamber 18. If adjusting the force of the pressurizing means of the first pressure chamber 11 to be larger than the force of the pressurizing means of the second pressure chamber 18, the resultant force received by the valve member 7 from the pressurizing means becomes a downward force.

Therefore, the valve member 7 stabilizes at a position where the downward resultant force of the pressurizing means and the upward force due to the difference of the fluid pressure in the first valve chamber 13 and in the bottom second valve chamber 14 balance. That is, the pressure in the bottom second valve chamber 14 is autonomously adjusted by the open area of the fluid control part 46 so that the resultant force of the pressurizing means and the force due to the fluid pressure difference balance.

Therefore, if the downward resultant force of the different pressurizing means does not change, the difference of fluid pressure in the first valve chamber 13 and in the bottom second valve chamber 14 becomes constant and the pressure difference before and after the communication hole 40 is held constant. Accordingly, the flow rate of the fluid flowing through the valve is held constant at all times.

Due to the above operation, even if there is a change in the fluid pressure before and after the constant flow valve, the flow rate can be held constant.

Further, since this constant flow valve operates so that the resultant force of the different pressurizing means acting on the valve member 7 and the force due to the difference of fluid pressure in the first valve chamber 13 and in the bottom second valve chamber 14 balance, if adjusting the resultant force of the different pressurizing means acting on the valve member 7, the difference of fluid pressure in the first valve chamber 13 and in the bottom second valve chamber 14 becomes a corresponding value. Therefore, the pressure difference before and after the communication hole 40 can be changed, so the flow rate can be changed and adjusted without disassembling the valve.

Further, if adjusting the force due to the pressurizing means of the first pressure chamber 11 so as to be smaller than the force due to the pressurizing means of the second pressure chamber 18, the resultant force acting on the valve member 7 becomes just an upward force, so that the valve body 43 of the valve member 7 is pushed against the valve seat 27 of the opening 26 of the body-B 3 to cut off the fluid. That is, the constant flow valve becomes closed.

Figure 7:
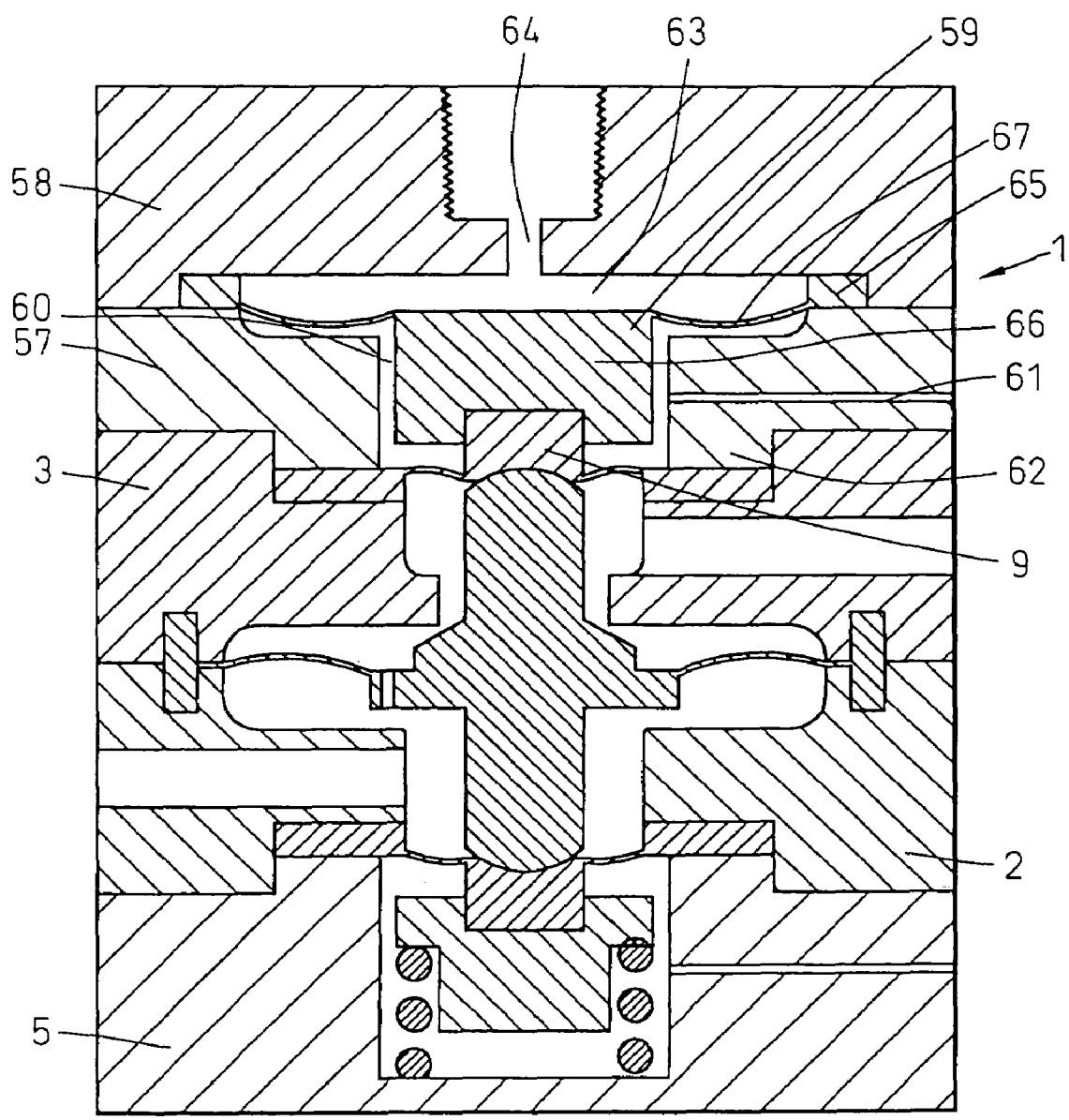
FIG. 7 is a longitudinal sectional view showing another embodiment of a constant flow valve according to the present invention.
Figure 8:
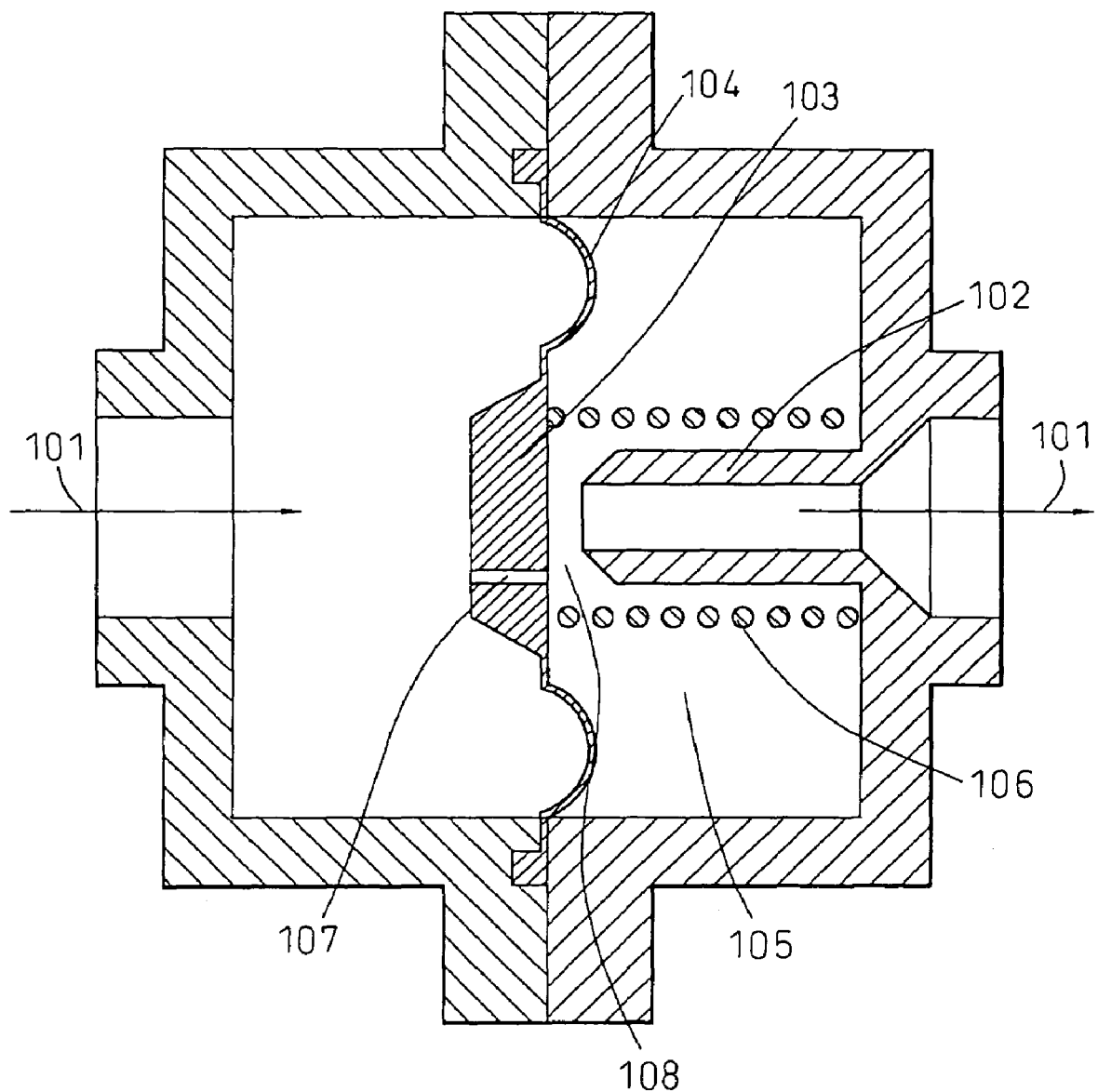
FIG. 8 is a longitudinal sectional view of a conventional constant flow valve.

FIG. 7 is a longitudinal sectional view showing a second embodiment of a constant flow valve according to the present invention. This embodiment uses compressed air as the pressurizing means instead of a spring.

The body-A 2, the body-B 3, the body-D 5, the valve member 7, the second diaphragm 9, the third diaphragm 10, and the means for pressing the third diaphragm 10 are the same in structure as in the constant flow valve of the first embodiment and the operation is similar to that of the constant flow valve of the first embodiment. Therefore, the explanation thereof will be omitted.

Referring to FIG. 7, a body-E 57 fixedly engaged with the top of the body-B 3 is provided. The body-E 57 has a circular cross-section diaphragm chamber 60 extending through the center thereof between the top and bottom end faces of the body-E 57 and enlarged at the top thereof, and an air vent 61 communicating the diaphragm chamber 60 with the outside. The bottom end face is provided with a ring-shaped projection 62 centered around the diaphragm chamber 60 and engaged with the step difference 24 of the body-B 3.

A body-F 58 positioned at the top of the body-E 57 has an air chamber 63 provided at the bottom thereof and an air feed port 64 extending through the air chamber 63 and the top end face to introduce compressed air etc. from the outside to the air chamber 63.

A fourth diaphragm 59 has a cylindrical rib 65 provided at the circumferential edge thereof and having an outside diameter substantially equal to the outside diameter of the diaphragm chamber 60 of the body-E 57, a columnar part 66 provided at the center thereof, and a film 67 connecting the inner circumference of the bottom end face of the cylindrical rib 65 and the outer circumference of the top end face of the columnar part 66. The cylindrical rib 65 is fixedly engaged with the diaphragm chamber 60 of the body-E 57 and is clamped and held between the body-B 3 and the body-E 57. The columnar part 66 is movable up and down in the diaphragm chamber 60. Further, the bottom of the columnar part 66 is engaged with the thick part 47 of the second diaphragm 9 (FIG. 2).

Figure 6:
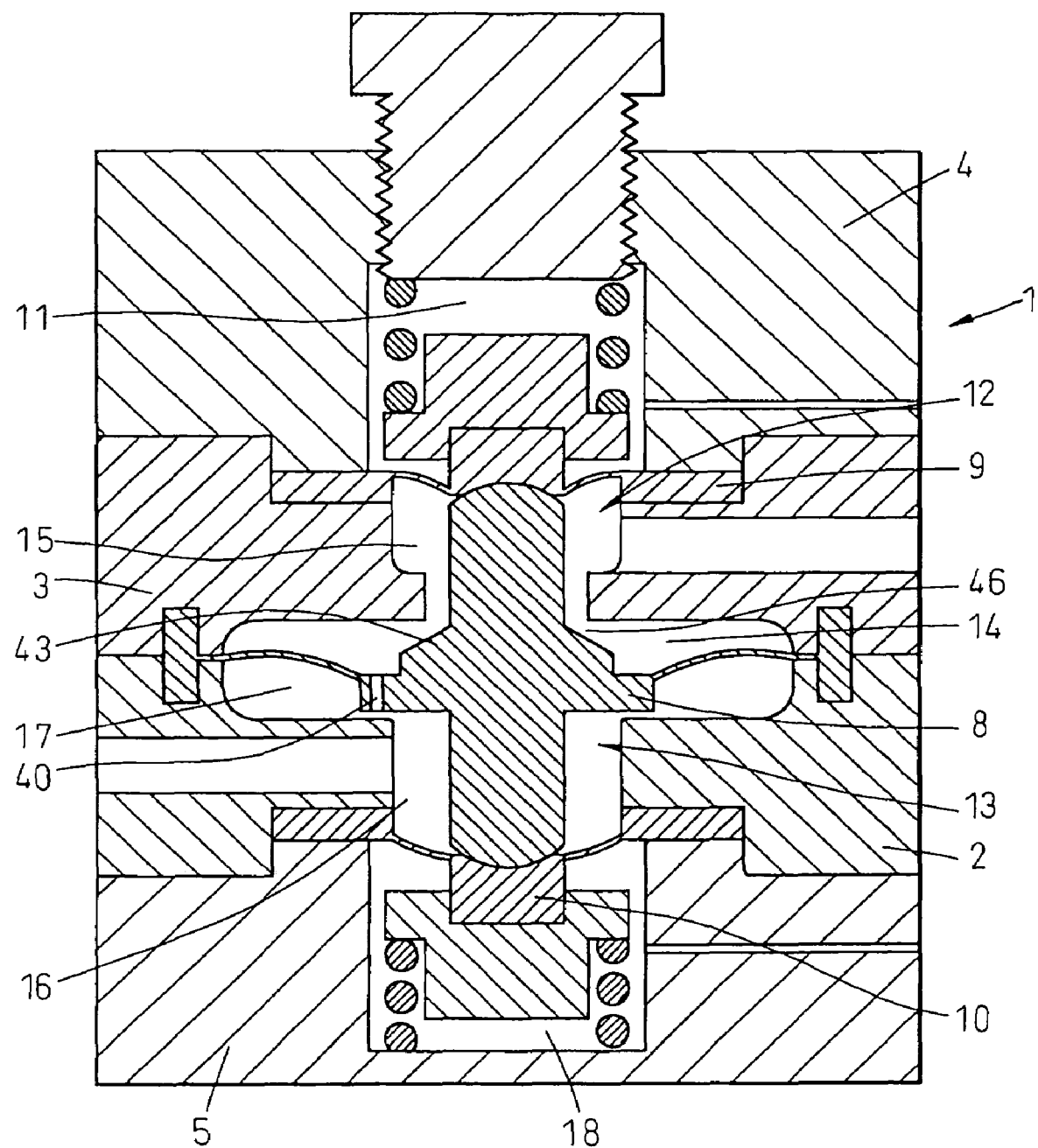
FIG. 6 is a longitudinal sectional view showing the state where the upstream pressure decreases or the downstream side pressure increases in FIG. 1.

Due to the above configuration, the second diaphragm 9, the diaphragm chamber 60 of the body-E 57, and the air chamber 63 of the body-F 58 form a first pressure chamber 11 (FIG. 1), so that the top surface of the fourth diaphragm 59 receives pressure of compressed air etc. thereby to press the second diaphragm 9 inward (in FIG. 6, downward) at all times.

Since the operation is the same as the first embodiment, the explanation will be omitted. By using compressed air as the pressurizing means, it is possible to adjustably change the pressure of the compressed air and thereby adjustably change the force pressing the second diaphragm 9 inward (in FIG. 6, downward). Therefore, if adjusting the pressure of the compressed air by means of an electrically actuated air pressure type regulator etc., the flow rate can be changed or the flow can be cut off by remote control operation.

The constant flow valve of the present invention having the above configuration has the following superior features.

(1) Since, the flow rate can be changed by changing the inward force of the pressurizing means of the first pressure chamber, the flow rate can be changed without disassembling the valve.

(2) Since the spring and other metal do not contact the fluid, contamination of the fluid due to dissolution of metal can be prevented.

(3) Since the fluid can be cut off by adjusting the inward force of the pressurizing means of the first pressure chamber to be smaller than the inward force of the pressurizing means of the second pressure chamber, there is no need to connect a separate valve for cutting off the fluid.

(4) If the pressurizing means of the first pressure chamber using compressed air is used, an electrically actuated air pressure type regulator etc. may be used to change the flow rate or cut off the flow by remote control operation.

The invention claimed is:

1. A constant flow valve, comprising a body unit formed by a inlet channel and outlet channel for fluid and a chamber communicating with the inlet channel and outlet channel, and a valve member provided in said chamber and having a valve body and a first diaphragm,
wherein said constant flow valve further comprises a second diaphragm and third diaphragm positioned at the two sides of said valve member in said chamber and having effective pressure receiving areas smaller than the first diaphragm, said valve member and said diaphragms being mounted in said chamber by the diaphragms being fixed to said body unit at the circumferences thereof, said chamber being divided into a first pressure chamber formed between one end of said chamber and said second diaphragm, a second pressure chamber formed between the other end of said chamber and said third diaphragm, a first valve chamber formed between said first diaphragm and said third diaphragm, and a second valve chamber formed between said first diaphragm and said second diaphragm, said first pressure chamber having means for applying a constant inward force to said second diaphragm at all times, said first valve chamber communicating with said inlet channel, said second valve chamber having a valve seat cooperating with said valve body of said valve member, said second valve chamber being divided into a bottom second valve chamber positioned at the first diaphragm side with respect to said valve seat and communicating with said first valve chamber through a communication hole formed in said first diaphragm and a top second valve chamber positioned at said second diaphragm side and communicating with said outlet channel, the space between said valve body and said valve seat forming a fluid control part using displacement of said valve member with respect to said valve seat to change the opening area between said valve body and said valve seat to control the fluid pressure of said bottom second valve chamber, said second pressure chamber having means for applying a constant inward force to said third diaphragm at all times.

2. The constant flow valve according to claim 1, wherein the means for applying a constant inward force is a spring device or pressurized fluid.

3. The constant flow valve according to claim 1, wherein a fourth diaphragm is provided in said first pressure chamber and constant force is applied through said fourth diaphragm to said second diaphragm.

4. The constant flow valve according to claim 2, wherein a fourth diaphragm is provided in said first pressure chamber and constant force is applied through said fourth diaphragm to said second diaphragm.

* * * * *